United States Patent [19]

Watanabe

[11] Patent Number: 4,773,517
[45] Date of Patent: Sep. 27, 1988

[54] TORQUE CONTROL SYSTEM FOR VEHICLES

[75] Inventor: Kenichi Watanabe, Hiroshima, Japan

[73] Assignee: Mazda Motor Corporation, Hiroshima, Japan

[21] Appl. No.: 11,869

[22] Filed: Feb. 6, 1987

[30] Foreign Application Priority Data

Feb. 7, 1986 [JP] Japan .................. 61-25267

[51] Int. Cl.⁴ .............. F16D 25/14; F16D 43/284
[52] U.S. Cl. ................. 192/0.032; 180/197; 180/233; 192/103 F
[58] Field of Search ........... 192/0.032, 0.033, 0.034, 192/103 F; 180/233, 247, 197

[56] References Cited

U.S. PATENT DOCUMENTS

| | | | |
|---|---|---|---|
| 3,760,922 | 9/1973 | Rolt et al. | 192/111 B |
| 4,466,502 | 8/1984 | Sakai | 180/247 |
| 4,484,654 | 11/1984 | Hayakawa | 180/247 |
| 4,523,281 | 6/1985 | Noda et al. | 192/0.033 X |

FOREIGN PATENT DOCUMENTS

| | | | |
|---|---|---|---|
| 0026636 | 2/1983 | Japan | 180/233 |
| 0056920 | 4/1983 | Japan | 180/247 |
| 2114252 | 8/1983 | United Kingdom | |

*Primary Examiner*—Rodney H. Bonck
*Attorney, Agent, or Firm*—Fleit, Jacobson, Cohn & Price

[57] ABSTRACT

A torque control system comprising a torque transmitting device interposed in a torque transmitting path through which drive torque is transmitted from a power plant to wheels, a selecting device for selecting a single control property among a plurality of control properties in which the amount of drive torque from a power plant to wheels through the torque transmitting device is determined corresponding to drive conditions of a vehicle, and a torque control unit for controlling the amount of the torque transmitted through the torque transmitting device in accordance with the control property selected by the selecting device so that the torque distribution for the rear wheels can be maintained at a desirable value in accordance with drive condition of the vehicle.

20 Claims, 6 Drawing Sheets

TORQUE CONTROL SYSTEM FOR VEHICLES

BACKGROUND OF THE INVENTION

The present invention relates to a torque control system for vehicles, and more particularly to a torque control system in order to control a drive torque transmitted from a power plant to front and rear wheels, and to left and right wheels.

DESCRIPTION OF THE PRIOR ART

There is known a torque control system provided with torque transmitting means, such as a wet clutch and a viscose coupling in which a torque transmitted therethrough is changed in accordance with a rotation difference between a input side and output side thereof. UK Patent Application No.2,114,252 published on Aug. 17, 1983 discloses a hydraulic friction clutch for transmitting the power of the engine to auxiliary driving wheels for four-wheel drive vehicle in which drive condition is adapted to be changed between four-wheel drive and two-wheel drive. In such torque transmitting means, there are provided a plurality of friction plates connected with rotation shafts of input side and output side respectively in which the friction plate of the input side shaft and the friction plate of the output shaft are disposed alternately.

In such wet clutch, input side friction members are adapted to be brought into engagement with the output side friction members by means of fluid pressure such as hydraulic pressure to transmit drive torque in accordance with engaging force thereof. Therefore, it is possible to control the amount of torque transmitted through the wet clutch by controlling the engaging force or fluid pressure.

As disclosed in U.S.Pat. No. 3,760,922, in a viscose coupling, there are disposed annular plates or friction plates in viscose fluid to transmit drive torque by shearing force produced in the fluid so that it is possible to obtain a desirable torque transmitting property by controlling an opening area formed in the plate.

In determining the torque transmitting property, it will be understood that an optimum torque transmitting property should be determined in accordance with vehicle operating condition. For instance, when the vehicle is driven on a snowy road, rear wheels are apt to slip in comparison with front wheel because of small friction coefficient of the road so that a drive torque loss may increase in the rear wheels where torque distribution for the rear wheels is maintained at the same value as that in a normal road operation.

SUMMARY OF THE INVENTION

It is therefore an object of the present invention to provide an improved torque control system in which an optimum torque distribution ratio among wheels can be provided in accordance with vehicle driving condition.

It is another object of the present invention to provide an improved torque control system in which torque distribution ratio can be changed among wheels in accordance with vehicle driving condition such as road condition.

According to the present invention, the above and other objects can be accomplished by means of a torque control system comprising torque transmitting means in which the amount of drive torque transmitted therethrough can be changed, the torque transmitting means being interposed in a torque transmitting path through which drive torque is transmitted from a power plant to wheels CHARACTERIZED IN THAT the torque control system further comprises selecting means for selecting a single control property among a plurality of control properties in which the amount of drive torque from a power plant to wheels through the torque transmitting means is determined corresponding to drive conditions of a vehicle, and torque control means for controlling the amount of the torque transmitted through the torque transmitting means in accordance with the control property selected by the selecting means. The selecting means preferrably comprises detecting means for detecting driving condition of vehicle, and changing means for changing control property from one to another in accordance with the driving condition detected by the detecting means.

According to features of the present invention, a desirable torque control property is selected to control the amount of the drive torque transmitted to the wheels, and the selected control property can be replaced by a suitable one in accordance with the driving condition.

The above and other objects and features of the present invention will become apparent from the following description of preferred embodiments taking reference to the accompanying drawings.

DESCRIPTION OF THE PREFERRED EMBODIMENTS

Figure 1:
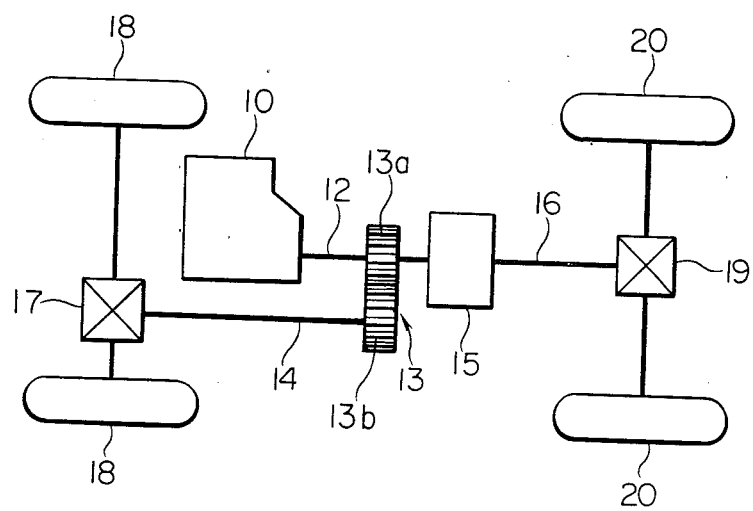
FIG. 1 is a diagrammatical plan view of a torque transmitting system to which the present invention can be applied.

Referring to the drawings, particularly to the FIG. 1, there is shown a four-wheel drive vehicle drive system to which the present invention can be applied. the system includes a power plant 10 which may be an internal combustion engine or a transmission gear mechanism which transmits the engine output power. The power plant 10 has an output shaft 12 which carries a driving gear 13a of a transfer gear mechanism 13. The gear 13a is in meshing engagement with a driven gear 13b of the transfer gear mechanism 13. The driven gear 13b is provided on a front propeller shaft 14 which is connected through a final gear unit 17 such as a front differential gear unit with front wheels 18.

The output shaft 12 of the power plant 10 is further connected through a torque transmitting mechanism such as a hydraulic variable clutch 15 with a rear propeller shaft 16. The rear propeller shaft 16 is connected through a final gear unit such as a rear differential gear unit 19 with rear wheels 20. It will therefore be understood that a first torque transmitting path is provided by the power plant 10, the output shaft 12, the transfer gear mechanism 13, the front propeller shaft 14, the front differential gear unit 17 and the front wheels 18. A second torque transmitting path is provided by the power plant 10, the output shft 12, the variable clutch 15, the rear propeller shaft 16, the rear differential gear unit 19 and the rear wheels 20.

Figure 2:
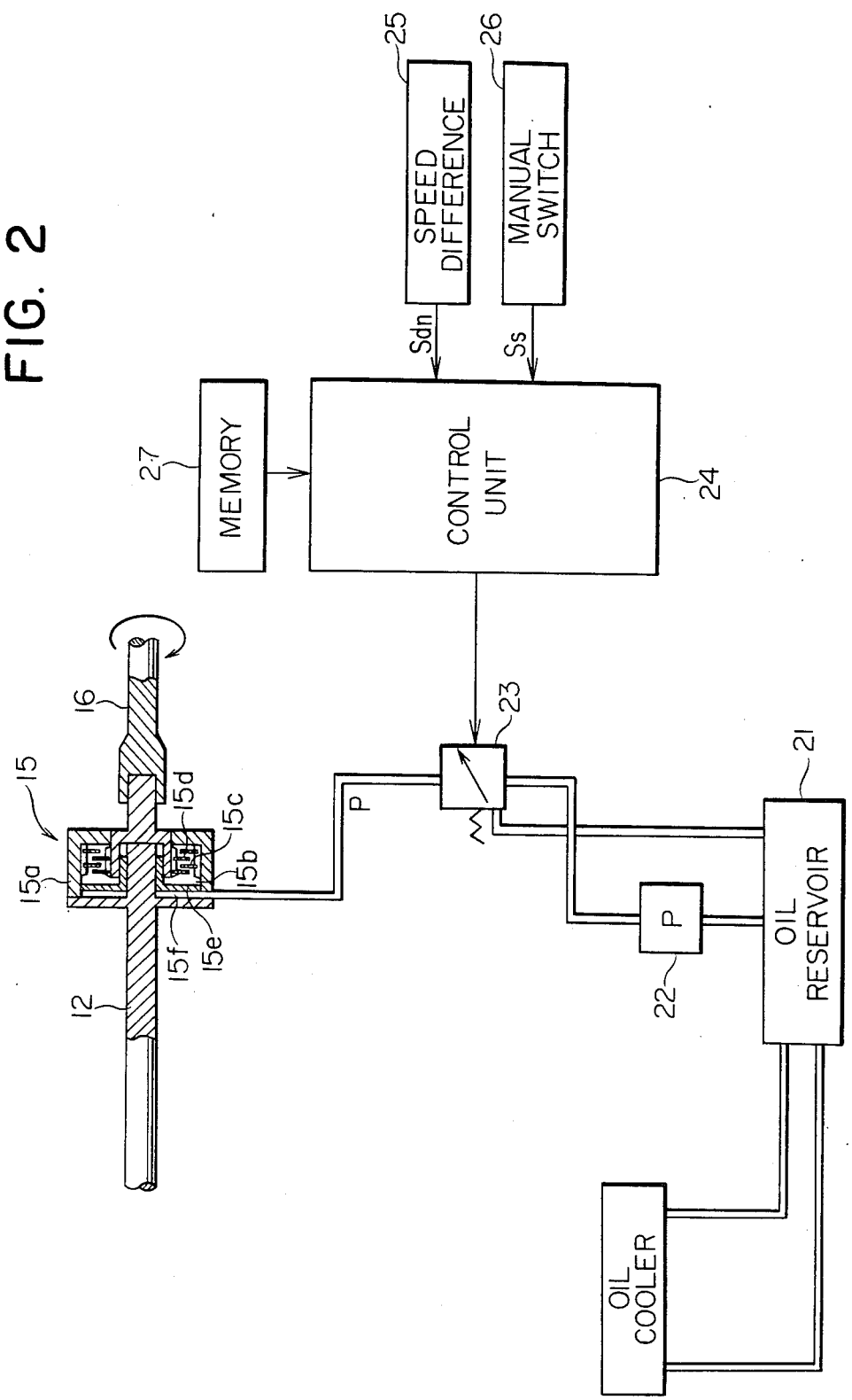
FIG. 2 is a diagrammatical illustration showing one embodiment of the present invention.

The variable clutch 15 is of a type in which the torque transmitting capacity can be adjusted by controlling the hydraulic pressure applied to the clutch 15. Referring to FIG. 2, it will be noted that the variable clutch 15 includes a casing 15a which is formed integrally with the output shaft 12 of the power plant 10 and defines a clutch chamber 15b in the casing 15a. The casing 15a is provided with a plurality of friction plates 15d which are interlaced with the friction plates 15c on the casing 15a. The friction plates 15c are carried on the casing 15a into friction engagement with the friction plates 15d on the rear propeller shaft 16.

Behind the piston 15e, there is defined a hydraulic chamber 15f which is connected through a magnetic control valve 23 with a hydraulic pump 22. The hydraulic pump 22 draws hydraulic liquid from a hydraulic oil reservoir 21 and supplies the hydraulic oil under pressure to the control valve 23. The control valve 23 functions to adjust the hydraulic pressure applied to the hydraulic chamber 15f in the variable clutch 15. It will be understood that the slip rate between the friction plates 15c and 15d can be adjusted by changing the hydraulic pressure applied to the hydraulic chamber 15f.

In order to control the valve 23 so that the hydraulic pressure to the chamber 15f is appropriately controlled, there is provided a control unit 24. The control unit 24 is connected with a speed difference detector 25 and a selecting switch 26 to receive therefrom. The speed difference detector 25 detects the speed difference between the front propeller shaft 14 and 16 the rear propeller shaft and produce a speed difference signal Sdn. The selecting switch 26 is provided for selecting a torque transmitting property in the hydraulic clutch 15 and produces signals Ss. The control unit 24 is connected with a memory 27 in which a plurality of torque transmitting properties are memorized in accordance with vehicle driving condition such as road condition.

Figure 3:
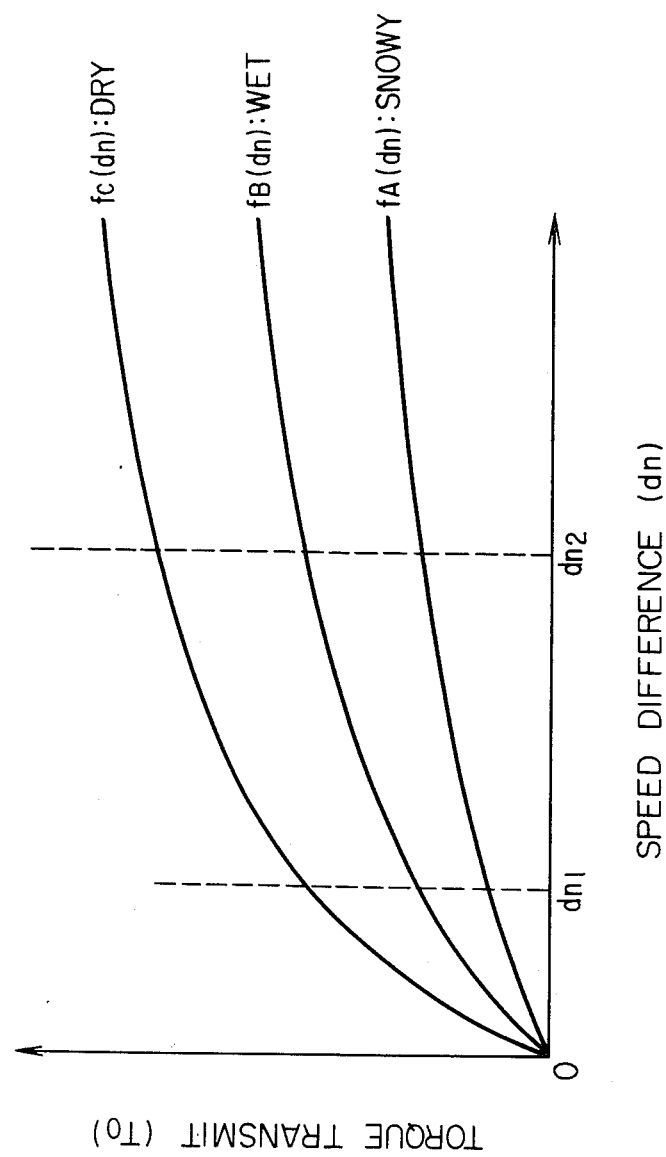
FIG. 3 is a graphical representation showing a relationship between speed difference and transmitted torque.

As shown in FIG. 3, there are provided control lines $f_A$, $f_B$, $f_C$ corresponding to dry, wet, snowy road conditions respectively, one of which can be selected by the switch 26. Thus, the switch produces signal Ss denoting a control line selected among the control ines $f_A$, $f_B$, $f_C$. It should be noted that a rotation speed sensor which detects the rotation speed of the front propeller shaft 14 can be employed for the speed difference detector 25. In order to obtain the speed difference Sdn, a rotation speed sensor may be provided for detecting the rotation speed of the rear propeller shaft 16. The sensor is connected with the control unit 24 in which the speed difference Sdn is calculated based on the output of the sensor.

In this embodiment, in view of a fluctuation of the speed difference between front and rear wheels caused by the a fluctuation of the output of the power plant, the engaging force of the clutch is controlled based on the speed difference to thereby control the transmitted torque To so that a predetermined torque distribution can be accomplished between the front and rear wheels. The torque distribution is predetermined in accordance with the road conditions such as dry, wet and snowy road. The transmitted torque To is controlled in accordance with the torque control properties $f_A$, $f_B$, $f_C$ as shown in FIG. 3 so as to provide the predetermined torque distribution.

The control unit 24 selects a control line directed by the selecting signal Ss among the three control lines memorized therein in accordance with the speed difference signal Sdn. Thereafter the control unit 24 calculates a control current i based on the selected control line in accordance with the speed difference signal Sdn and provides the hydraulic control valve 23 with the control current i. In this embodiment, the control current i is proportional to hydraulic pressure generated by the control valve 23 and the hydraulic pressure is proportional to the torque To transmitted through the clutch 15 so that desirable torque control can be performed in accordance with the control lines $f_A$, $f_B$, $f_C$ as shown in FIG. 3.

Figure 4:
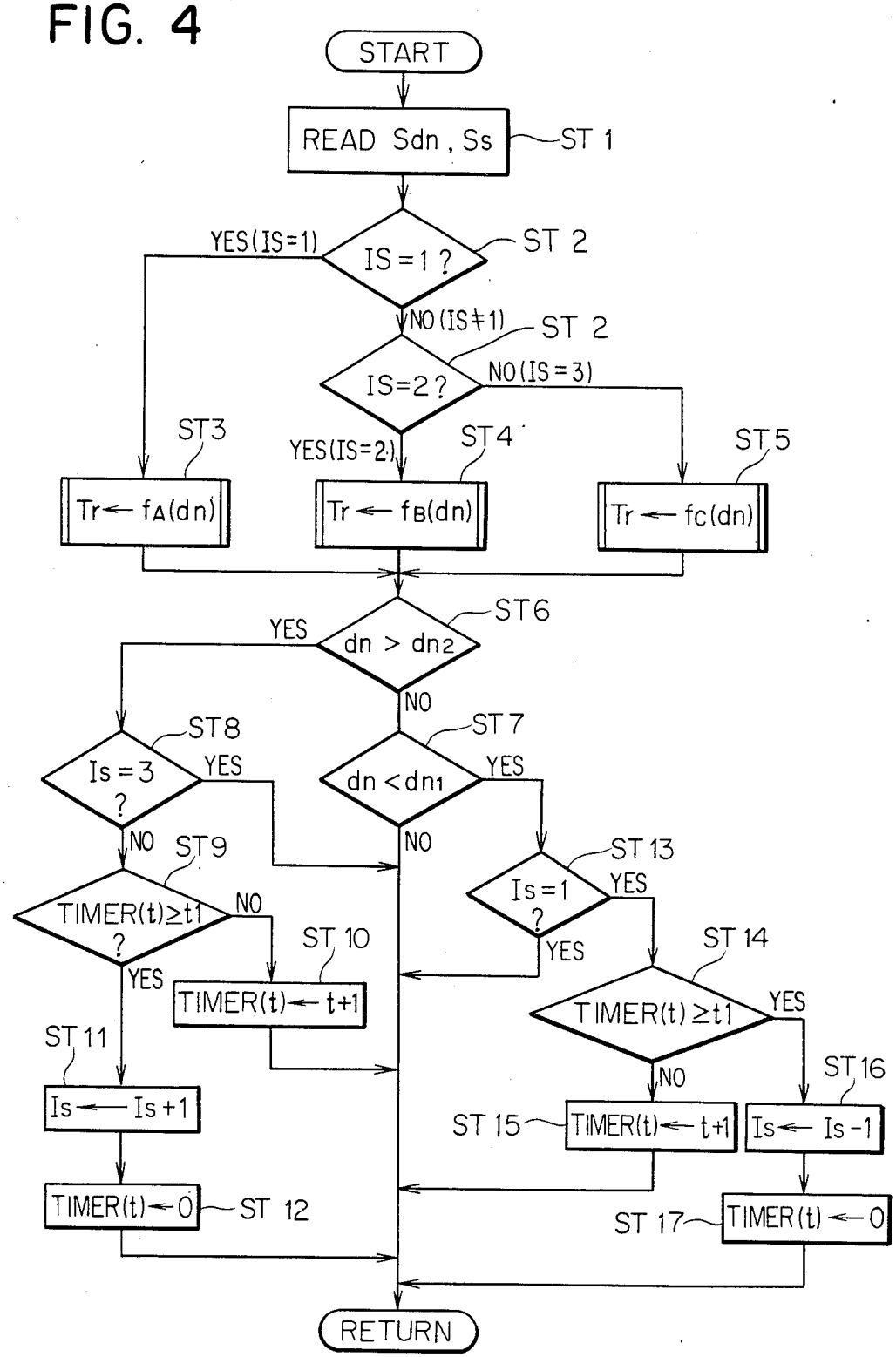
FIG. 4 is a program flow chart showing the control in accordance with the embodiment of the present invention.

A preferred shift control is decribed hereinafter in accordance with a flow chart shown in FIG. 4.

Firstly, the control unit 24 reads signals Sdn,Ss as input singnal in step ST1. At step ST 2, the control unit 24 judges whether the control property Is designated by the selecting signal Ss is 3 (dry), 2 (wet) or 1 (snowy). Where the road condition is dry, the control unit carries out step ST5 wherein the transmitted torque is controlled in accordance with the control property $f_C$(dn) in FIG. 3. Likewise, when wet or snowy, the transmitted torque is controlled in accordance with the control property $f_A$(dn) or $f_B$(dn) in step ST4 or ST3 respectively.

It will be noted that the control property $f_C$ corresponding to dry road condition provides larger value of the torque To transmitted through the clutch for a same speed difference Sdn in comparison with the control property $f_B$ corresponding to wet road condition which provides a larger value than the control property $f_A$ corresponding to snowy road condition. It will therefore be understood that where the driver selects the control line $f_A$ when the vehicle runs in snowy road of a low frictional resistance, the torque distribution is restrained for the rear wheels which are apt to slip under such snowy road condition so that the torque distribution can be increased for the front wheels to thereby reduce the slip loss of the driving force. On the other hand, where the control line $f_C$ is selected under dry road condition of a high road resistance, the torque distribution is increased for the rear wheels so that insufficiency of the drive torque wheels can be eliminated in the rear wheels. Further where the vehicle runs under wet road condition of an intermediate road resistance between the dry and snowy road conditions, the control line $f_B$ can be selected for obtaining a desirable driving property.

In step ST6, the control unit 24 judges whether or not the speed difference dn is larger than a predetermined value $dn_2$ and whether or not the speed difference dn is smaller than a predetermined value $dn_1$ (smaller than the value $dn_2$) in step ST7. Where judgements are NO in both steps 6 and 7, the present control line Tr is proper because the speed difference dn is within an appropriate range (between the values $dn_1$ and 2). In this case, the present torque distribution control will be continued in accordance with the control property Tr.

On the other hand if, the speed difference dn is larger than the value $dn_2$ in step ST6, the control line is shifted from the present control property Tr to a control property in which the torque distribution is increased for the rear wheels. The large value of the speed difference dn stands for an unduly small rotation speed of the rear wheels in comparison with the front wheels caused by the fact that the torque distribution is insufficient for the rear wheels irrespective of a high road resistance. Accordingly, in order to eliminate the insufficiency of the drive torque, it is necessary to increase the torque distribution for the rear wheels. In steps ST8 through ST12, there is shown a shift control of the control property Tr. In step ST8, the control unit judges which control property Is is presently employed. In this embodiment, where Is is 3 corresponding to dry road condition, the control unit 24 maintains the present control because there is no control property which provides the rear wheels with any larger torque distribution. Where Is takes a value other than 3, the control unit 24 carries out the steps ST9, ST10 to judge whether the speed difference dn is larger than $dn_2$ for more than a predetermined time t1 or not. Where the time exceeds t1, the step ST11 is carried out in which the control property Is is changed to a control line which provides a larger value of the transmitted torque for the same speed difference. Thereafter, the torque transmitting control is carried out in accordance with the control property Tr which has been changed.

On the other hand, when the speed differenced dn is smaller than $dn_1$ wherein the road resistance is rather small to cause slip between the road surface and the rear wheels, the control unit 24 carries out step ST7 and then selects (YES) in the following steps so as to change the present control line Tr to another control line in which the amount of the torque transmitted through the clutch is reduced. Under this road condition, it will be understood that the vehicle cannot obtain sufficient driving force even though the torque distribution is increased for the rear wheels. Therefore, it is necessary to reduce the torque distribution for the rear wheels in order to save drive torque loss. There is shown a shift control of the control line Tr in steps ST13 through ST17. In step ST13, the control unit 24 judges which control property Is is presently employed. In this embodiment, where Is is 1 corresponding to snowy road condition, the control unit 24 selects (YES) in the following steps after carrying out step ST13 to maintain the present control because there is no control property which provides the rear wheels with any smaller torque distribution. Where Is takes a value other than 1, the control unit 24 carries out the steps ST14, ST15 to judge whether the speed difference dn is smaller than $dn_1$ for more than a predetermined time t1 or not. Where the time exceeds t1, the step ST 16 is carried out in which the control property Is is changed to a control line which provides a smaller value of the transmitted torque for the same speed difference. Thereafter, the torque transmitting control is carried out in accordance with the control property Tr which has been changed.

According to this embodiment, an appropriate torque distribution can be accomplished in accordance with the road conditions.

There is decribed hereinafter another embodiment in accordance with the present invention.

Figure 5:
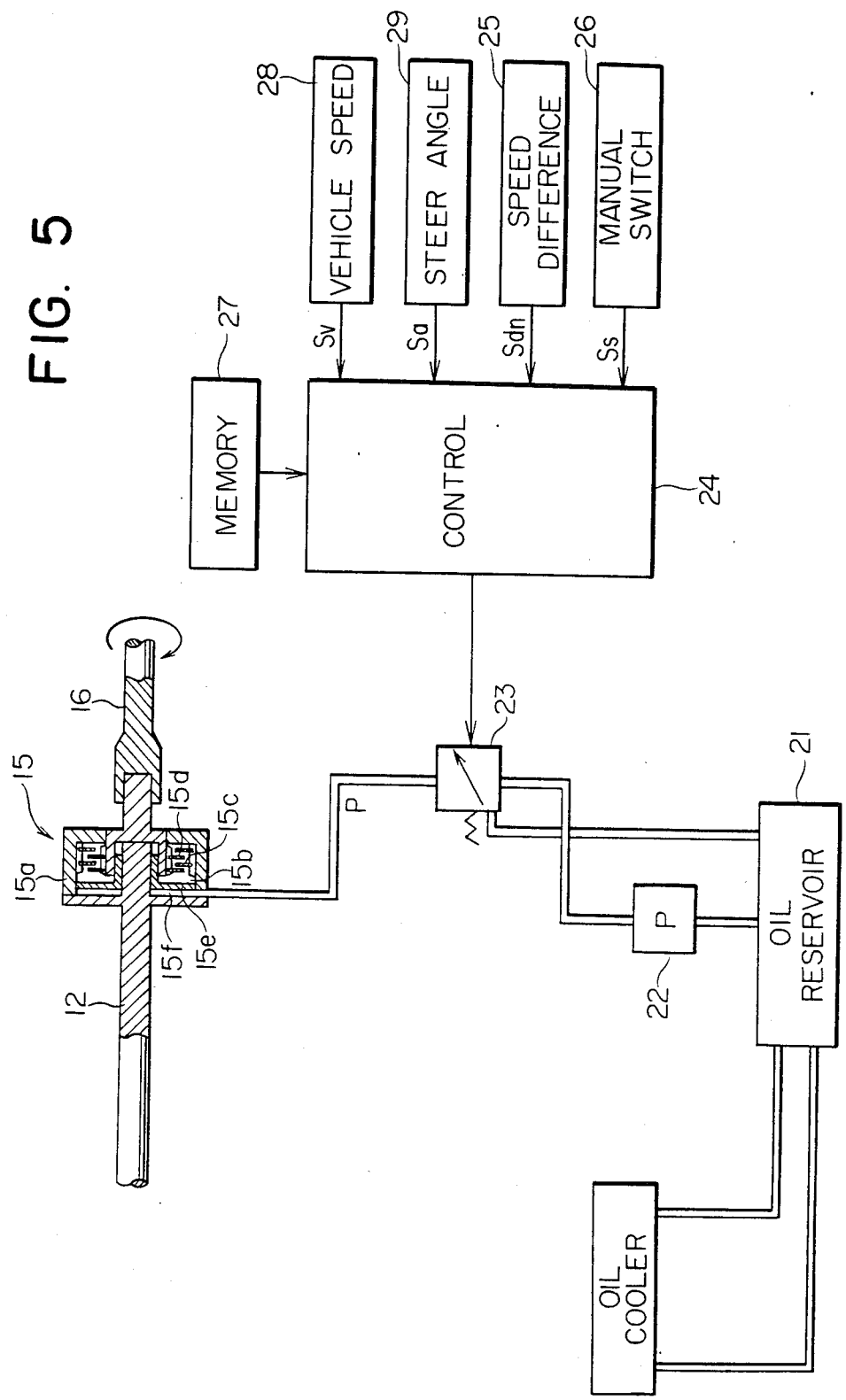
FIG. 5 is a diagrammatical illustration showing another embodiment of the present invention.

Now referring to FIG. 5, vehicle control system of the present embodiment is provided with a vehicle speed sensor 28 and a steering angle sensor 29 in addition to the control system as shown in FIG. 2. These sensors 28, 29 are connected with the control unit 24. The vehicle speed sensor 28 detects vehicle speed and produces a signal Sv in accordance with the vehicle speed. The steering angle sensor 29 detects steering angle to produce a signal Sa corresponding to the detected value.

Figure 6:
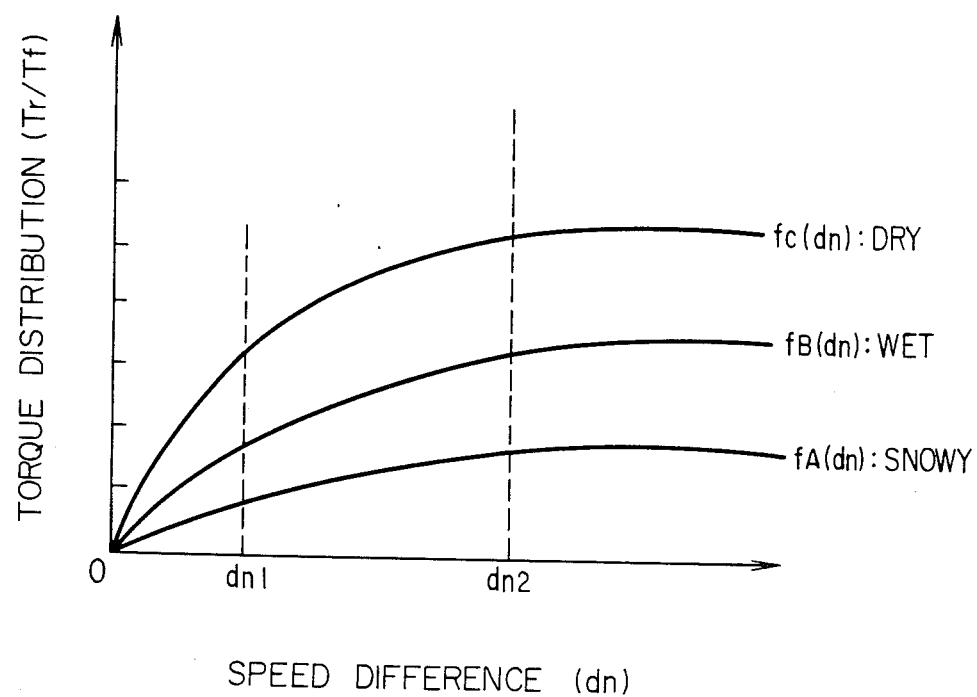
FIG. 6 is a graphical representation showing a relationship between torque distribution ratio and speed difference in accordance with another embodiment of the present invention.

Further in this embodiment, control lines as shown in FIG. 6 are memorized in the memory 27. The control unit 24 selects a control line in accordance with road condition on which the vehicle runs. In turn, the control unit 24 determines torque distribution ratio (Tr/Tf: wherein Tf, Tt are drive torque transmitted to the front and rear wheels respectively) between the front and rear wheels in accordance with the speed difference dn on the basis of the control line selected among the control lines shown in FIG. 6.

In this case, in order to obtain a desirable torque distribution between the front and rear wheels based on control lines of torque distribution ratio as shown in FIG. 6, it is necessary to detect the engine output torque because the torque distribution ratio is affected by a change of the engine output torque. It should however be noted that a torque sensor for directly detecting the engine output torque is too expensive to properly apply for the present invention. According to this embodiment, the engine output torque can be easily detected by employing the speed sensor, the steering angle sensor and the speed difference sensor in lieu of the torque sensor.

Thereafter, the control unit 24 determines control current i in accordance with the torque distribution ratio (Tr/Tf), the signal Sv denoting vehicle speed, and the signal Sa denoting steering angle so as to provide a desirable torque transmitted to the rear wheels.

In aforementioned embodiment, there is described a vehicle control system provided with three control lines in accordance with various road conditions, a hydraulic clutch interposed between the front and rear wheels. However, the present invention is not limited to the embodiment but can be applied to any vehicle control system comprising a plurality of torque control lines. It will further be understood that the torque transmitting means such as clutch can be disposed between right and left wheels.

Though the shift control is applied to control lines denoting road conditions in the embodiments, another parameter can be employed as a control line to which the shift control can be applied.

Further, though the description is referred to a manual switch for switching the control lines, an automatic switch can be employed for the same object.

I claim:

1. A torque control system comprising torque transmitting means in which the amount of drive torque transmitted therethrough can be changed, the torque transmitting means being interposed in a torque transmitting path through which drive torque is transmitted from a power plant to wheels CHARACTERIZED IN THAT the torque control system further comprises selecting means for selecting a single control property among a plurality of control properties each of said control properties being adapted to provide a continuous change in the amount of drive torque transmitted from the power plant to the wheels through the torque transmitting means as drive conditions of a vehicle change, and torque control means for controlling the amount of the torque transmitted through the torque transmitting means in accordance with the respective control property selected by the selecting means.

2. A torque control system in accordance with claim 1 in which the torque transmitting means is provided in a torque transmitting path in which drive torque is transmitted from the power plant to a selected one of the front and rear wheels and drive torque is directly transmitted from the power plant to the other of the front and rear wheels bypassing the torque transmitting means.

3. A torque control system in accordance with claim 2 in which the selecting means is a manual switch.

4. A torque control system in accordance with claim 2 in which the torque transmitting means is provided in a torque transmitting path for transmitting the drive torque from the power plant to the rear wheels.

5. A torque control system in accordance with claim 2 in which the torque transmitting means includes friction members to be brought into frictional engagement with each other so that the torque transmitted through the members can be changed in accordance with engaging force of the members, and a piston for urging the members into frictional engagement.

6. A torque control system in accordance with claim 5 in which the control means is adapted to control a magnetic valve which controls hydraulic pressure by which the piston is actuated.

7. A torque control system in accordance with claim 6 in which the control properties are prepared so as to control the amount of the torque transmitted through the torque transmitting means in accordance with a rotation speed difference between the front and rear wheels in such a manner that the amount of drive torque transmitted from the power plant to the wheels through the torque transmitting means changes continuously as drive conditions of the vehicle change.

8. A torque control system in accordance with claim 6 in which the selecting means is a manual switch.

9. A torque control system in accordance with claim 6 in which the torque control means comprises detecting means for detecting driving condition of the vehicle, changing means for changing a control property selected to another control property in accordance with the driving condition detected by the detecting means.

10. A torque control system in accordance with claim 6 in which each of said control properties is adapted for determining a torque distribution ratio between the front and rear wheels in accordance with a rotation speed difference between the front and rear wheels to thereby control the amount of the torque transmitted through the torque transmitting means based on the torque distribution ratio in such a manner that the amount of drive torque transmitted from the power plant to the wheels through the torque transmitting means changes continuously as drive conditions of the vehicle change.

11. A torque control system in accordance with claim 1 in which at least one of the drive conditions is related with an amount of slip of the wheels.

12. A torque control system in accordance with claim 11 in which the amount of the drive torque transmitted through the torque transmitting means is reduced as the amount of slip of the wheels to which the drive torque is transmitted is increased.

13. A torque control system comprising torque transmitting means in which the amount of drive torque transmitted therethrough can be changed, the torque transmitting means being interposed in a torque transmitting path through which drive torque is transmitted from a power plant to wheels CHARACTERIZED IN THAT the torque control system further comprises selecting means for selecting a single control property among a plurality of control properties, each of said control properties being selected so as to provide a continuous change in the amount of drive torque transmitted from the power plant to the wheels through the torque transmitted from the power plant to the wheels through the torque transmitting means as driving conditions of a vehicle change, torque control means for controlling the amount of the torque transmitted through the torque transmitting means in accordance with the control property selected by the selecting means, the drive torque being transmitted from the power plant to a selected one of the front and rear wheels and directly transmitted to the other one of the front and rear wheels, and said control properties being adapted to control the amount of the torque transmitted through the torque transmitting means in accordance with a rotation speed difference between the front and rear wheels, and said torque control means being provided with detecting means for detecting the driving condition of the vehicle, changing means for changing a control property selected to another control property in accordance with the driving condition detected by the detecting means.

14. A torque control system in accordance with claim 13 in which the detecting means is adapted to detect the rotation speed difference between the front and rear wheels to switch automatically to a control property in which the torque distribution is increased for the rear wheels when the speed difference is larger than a predetermined value.

15. A torque control system in accordance with claim 13 in which the detecting means is adapted to detect the rotation speed difference between the front and rear wheels to switch automatically to a control property in which the torque distribution is reduced for the rear wheels when the speed difference is smaller than a predetermined value.

16. A torque control system in accordance with claim 15 in which the detecting means is adapted to detect the rotation speed difference between the front and rear wheels to switch automatically to a control property in which the torque distribution is increased for the rear wheels when the speed difference is larger than a first predetermined value which is larger than a second predermined value under which the torque distribution is reduced for the rear wheels.

17. A torque control system comprising torque transmitting means in which the amount of drive torque transmitted therethrough can be changed, the torque transmitting means being interposed in a torque transmitting path through which drive torque is transmitted from a power plant to wheels CHARACTERIZED IN THAT the torque control system further comprises selecting means for selecting a single control property among a plurality of control properties, each said control property being determined so as to provide a continuous change in the amount of drive torque transmitted from the power plant to the wheels through the torque transmitting means as drive conditions of a vehicle change, torque control means for controlling the amount of the torque transmitted through the torque transmitting means in accordance with the control property selected by the selecting means, the drive torque being transmitted selectively from the power plant to one of its front and rear wheels and directly transmitted to the other one of the front and rear wheels, and said detecting means being adapted to detect the speed difference between the front and rear wheels to switch to a control property in which the torque distribution is increased for the rear wheels when the speed difference is larger than a first predetermined value and to a control property in which the torque distribution is reduced for the rear wheels when the speed difference is smaller than a second predetermined value wherein the first predetermined value is larger than the second predetermined value.

18. A torque control system comprising torque transmitting means in which the amount of drive torque transmitted therethrough can be changed, the torque transmitting means being interposed in a torque transmitting path through which drive torque is transmitted from a power plant to wheels CHARACTERIZED IN THAT the torque control system further comprises selecting means for selecting a single control property among a plurality of control properties, each of said control properties being adapted for controlling the amount of the torque transmitted through the torque transmitting means in accordance with a rotation speed difference between front and rear wheels in such a manner that the amount of drive torque transmitted from a power plant to wheels through the torque transmitting means changes continuously as drive conditions of the vehicle change, torque control means for controlling the amount of the torque transmitted through the torque transmitting means in accordance with the respective control property selected by the selecting means, the drive torque being transmitted from the power plant to a selected one of the front and rear wheels and being directly transmitted to the other one of the front and rear wheels.

19. A torque control system comprising torque transmitting means in which the amount of drive torque transmitted therethrough can be changed, the torque transmitting means being interposed in a torque transmitting path through which drive torque is transmitted from a power plant to wheels CHARACTERIZED IN THAT the torque control system further comprises selecting means for selecting a single control property among a plurality of control properties, each of said control properties being adapted for determining a torque distribution ratio between front and rear wheels in accordance with a rotation speed difference between the front and rear wheels to thereby control the amount of the torque transmitted through the torque transmitting means based on the torque distribution ratio in such a manner that the amount of drive torque transmitted from the power plant to the wheels through the torque transmitting means changes continuously as drive conditions of a vehicle change, torque control means for controlling the amount of the torque transmitted through the torque transmitting means in accordance with the control property selected by the selecting means, the drive torque being transmitted from the power plant selectively to either one of the front and rear wheels and being directly transmitted to the other one of the front and rear wheels.

20. A torque control system comprising torque transmitting means in which the amount of drive torque transmitted therethrough can be changed, the torque transmitting means being interposed in a torque transmitting path through which drive torque is transmitted from a power plant to wheels CHARACTERIZED IN THAT the torque control system further comprises selecting means for selecting a single control property among a plurality of control properties, each of said control properties being selected in accordance with road conditions so as to be determined in a manner that the amount of drive torque transmitted from the power plant to the wheels through the torque transmitting means changes continuously as drive conditions of a vehicle change, and torque control means for controlling the amount of the torque transmitted through the torque transmitting means in accordance with the control property selected by the selecting means.

* * * * *